United States Patent
Mancuso et al.

(10) Patent No.: US 6,600,839 B2
(45) Date of Patent: *Jul. 29, 2003

(54) NON-LINEAR ADAPTIVE IMAGE FILTER FOR FILTERING NOISE SUCH AS BLOCKING ARTIFACTS

(75) Inventors: Massino Mancuso, San Diego, CA (US); Antonio Maria Bornco, Matera (IT)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/860,967

(22) Filed: May 17, 2001

(65) Prior Publication Data

US 2001/0031097 A1 Oct. 18, 2001

Related U.S. Application Data

(63) Continuation of application No. 09/087,959, filed on May 29, 1998.

(51) Int. Cl.[7] .............................. G06T 5/00; G06K 9/40; H04N 1/409; H04N 5/21
(52) U.S. Cl. ........................ 382/268; 382/199; 382/206; 382/205; 375/240.29
(58) Field of Search ................................ 382/268, 275, 382/199, 205, 206, 260, 190, 195; 375/240.26, 240.24, 240.29; 340/445, 446, 607

(56) References Cited

U.S. PATENT DOCUMENTS 6,285,801 B1 * 9/2001 Mancuso et al. ........... 382/268

FOREIGN PATENT DOCUMENTS

| EP | 0797349 A2 | 9/1997 |
| EP | 0881837 A1 | 12/1998 |

OTHER PUBLICATIONS

Hsu, Yuh–Feng and Yung–Chang Chen, "A New Adaptive Separable Median Filter for Removing Blocking Effects," *IEEE Trans. on Consumer Electron.*, 39(3):510–513, Aug. 1993.

Jarske et al., "Post Filtering Methods for Reducing Blocking Effects from Coded Images," *IEEE Trans. on Consumer Electro.*, 40(3):521–526, Aug. 1994.

Ramamurthi, Bhaskar and Allen Gersho, "Nonlinear Space–Variant Postprocessing of Block Coded Images," *IEEE Trans. Acous., Speech, and Signal Proc.*, ASSP–34(5):1258–1268, Oct. 1986.

Reeve III, Howard C. and Jae S. Lim, "Reduction of Blocking Effects in Image Coding," *Opt. Eng.*, 23(1):034–037, Jan.–Feb. 1984.

Reid et al., "Second–Generation Image Coding: An Overview," in *ACM Computing Surveys*, 29(1):3–29, Mar. 1997.

Xiaobing Lee et al., "Information Loss Recovery for Block–Based Image Coding Techniques—A Fuzzy Logic Approach," *IEEE Transactions on Image Processing* 4(3):259–273, Mar., 1995.

* cited by examiner

Primary Examiner—Scott Rogers
(74) Attorney, Agent, or Firm—David V. Carlson; Lisa K. Jorgenson

(57) ABSTRACT

A filter reduces artifacts, such as grid noise and staircase noise, in block-coded digital images with image block boundaries. The type of filtering is determined after an estimation of the image global metrics and local metrics. For areas of the image near grid noise, the filter performs low pass filtering. For image fine details, such as edges and texture, no filtering is performed so that masking is avoided. The filter operates in intra-field mode and uses a fuzzy logic process, pixel deltas, and dual ramp generators to determine the horizontal and vertical length of a processing window surrounding an image block boundary.

20 Claims, 11 Drawing Sheets

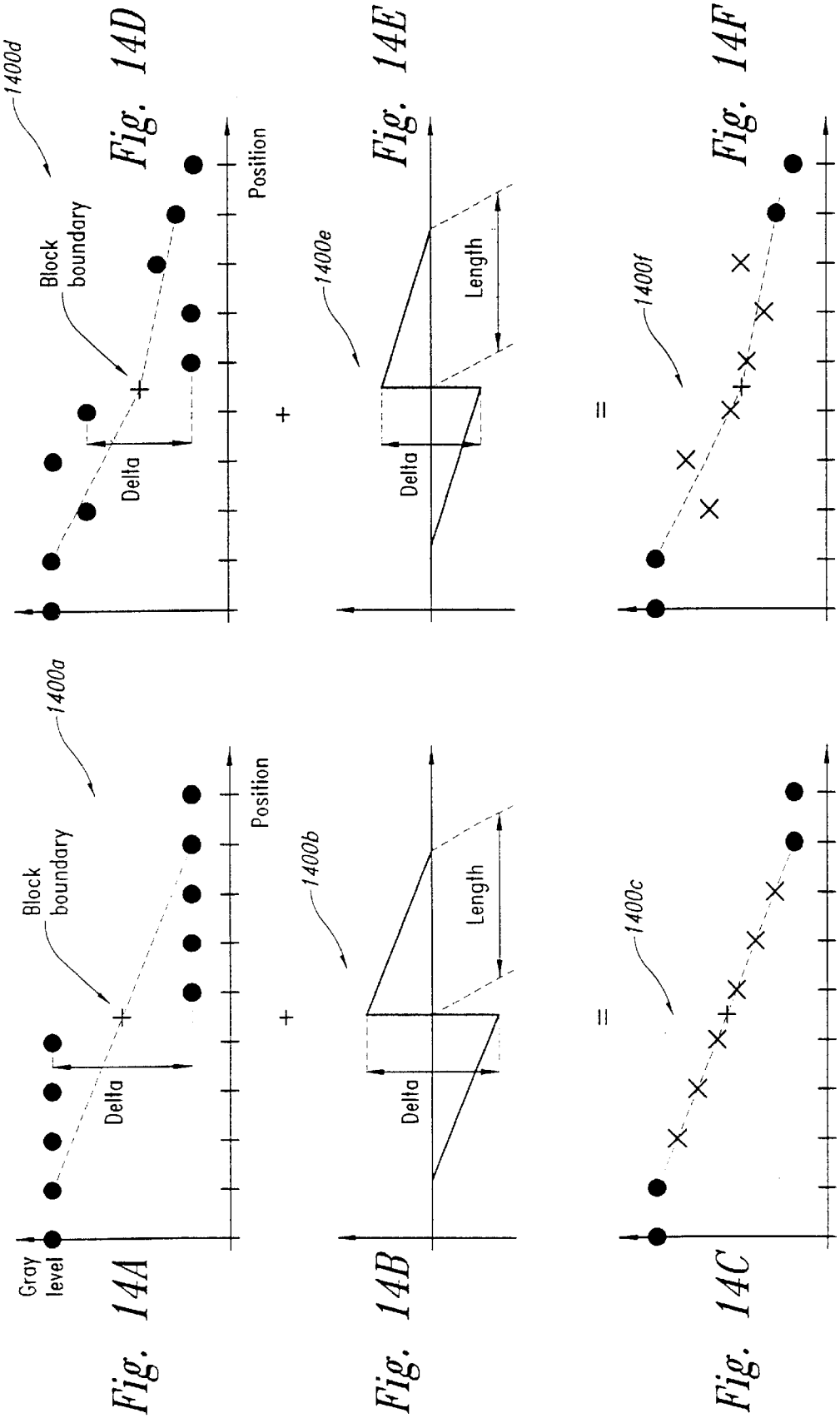

NON-LINEAR ADAPTIVE IMAGE FILTER FOR FILTERING NOISE SUCH AS BLOCKING ARTIFACTS

CROSS-REFERENCE TO RELATED APPLICATION

This application is a continuation of pending U.S. patent application Ser. No. 09/087,959, filed May 29, 1998, and allowed Nov. 30, 2000.

TECHNICAL FIELD

The present invention is related generally to digital signal processing and, in particular, digital signal processing of images.

BACKGROUND OF THE INVENTION

Many modern-day image processors utilize compression (or coding) techniques to minimize the amount of memory needed to store and process the images. The compression techniques used are those typically established by the International Standards Organization. For example, a Joint Photographic Experts Group (JPEG) of the International Standards Organization developed a JPEG digital data compression technique for editing still images, as well as for use in color facsimile (FAX) machines, and medical imaging systems. Digital image recorders use a compression technique developed by a Moving Pictures Expert Group (MPEG) to minimize the amount of data stored when acquiring or processing moving (or motion) pictures. An MPEG-1 standard generally is used for relatively low-level resolution, low-bit rate image sequences. An MPEG-2 standard has been developed to accommodate relatively high resolution, high-bit rate image sequences of the type generally used for full screen playback, such as in entertainment systems, web browsers, television (TV), high-definition TV (HDTV), or with image games played on personal computers (PCs).

These compression techniques typically divide an image into blocks of pixels (block coding) for processing. During processing, a well known discrete cosine transform (DCT) is applied to each block of pixels, the results of which are quantized and encoded. When the image is to be displayed, on a TV or PC, for example, it must be decoded in advance. Depending on the selected bit rate (i.e., compression factor), the images present noticeable degradation due to quantization errors. For example, when the compression ratio is increased, the artifacts of block coding the image become visible around the block boundaries. These blocking artifacts primarily consist of two types of artifacts: grid noise and staircase noise. When processing the image, the noise has characteristics similar to those of an image's fine details, such as the image's edges and textures. Any filtering of the noise thus usually filters the image's edges and textures, as well, causing blurring. It can be appreciated therefore that what is needed is a technique to reduce the blocking artifacts without blurring the image's fine details.

SUMMARY OF THE INVENTION

Presented herein is a system and method to reduce blocking artifacts that overcome the limitations associated with image compression standards. An example embodiment stores several rows of an image to be processed in line memories. The image rows contain a target pixel as well as pixels neighboring the target pixel. This exemplar extracts global metrics from the image, estimates local metrics related to the target pixel and the neighboring pixels as local metrics, uses fuzzy logic to determine the number of pixels to be processed, determines the difference in gray level values between the target pixel and the neighboring pixels, and smoothes any abrupt transitions in gray levels from the target pixel to neighboring pixels using a dual ramp generator.

Further features and advantages as well as the structure and operation of various embodiments are described in detail below.

BRIEF DESCRIPTION OF THE FIGURES

FIGS. 14A–14F are graphical representations of the operation of the filter depicted in FIG. 1.

DETAILED DESCRIPTION OF THE INVENTION

A filter, and in particular, a non-linear adaptive filter to reduce blocking artifacts is described herein. In the following description, numerous specific details, such as specific mathematical, statistical, and signal processing symbols and relationships, specific methods of analyzing and processing images, video signals, video sequences, etc., are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

Figure 1:
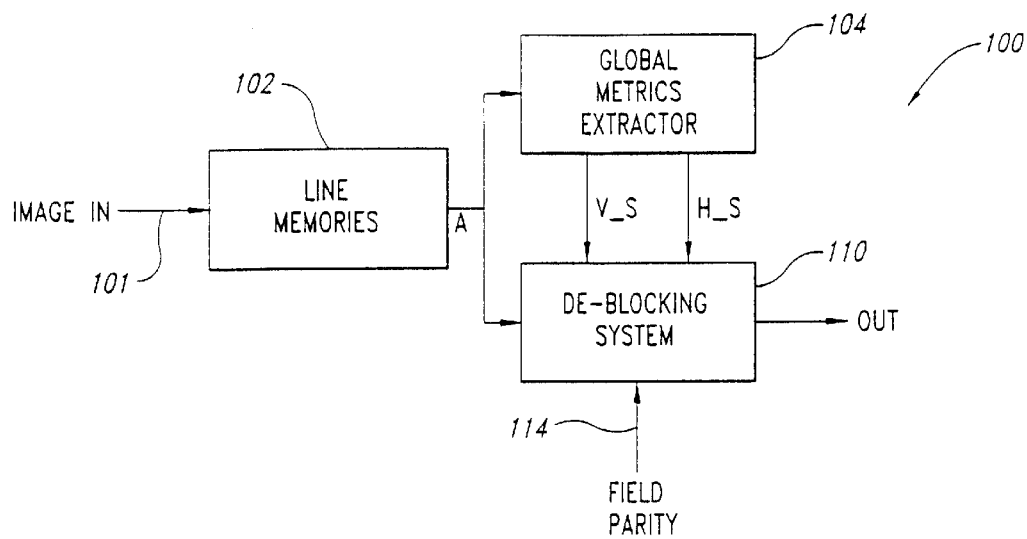
FIG. 1 is a high level block diagram of a filter suitable for implementing an embodiment.

FIG. 1 is a high-level block diagram of a filter 100 suitable for implementing an image processing operation of an exemplar. According to the exemplar, the filter 100 includes several line memories 102, a metrics extractor 104, and a de-blocking system 110, and receives as an input a field parity signal 114. The output of the filter 100 replaces the value assigned to a target pixel X with a function representative of the target pixel's metrics and the metrics of its neighbors. Typically the image is scanned sequentially row-by-row (or line-by-line) as a stream of pixels into the filter 100.

The source of the image can be a laser disk player, a camera, an analog image tape recorder, a real-time image from a CD-ROM or a disk drive, an image from a telephone line or telecommunication network, or a digital image tape recorder, for example. Of course, a particular source of the image is not required by the present invention.

The image is stored in the line memories for processing. The line memories 102 generate a processing window in which the image is processed. The processing window is described in detail below. The output of the line memories 102 is input to the global metrics extractor 104.

The global metrics extractor 104 receives and analyzes the image by extracting image attributes, such as amplitudes, edge point locations, textural descriptions, etc., using derivatives. One embodiment uses Sobel-like operators, which provide both differencing and smoothing. Smoothing compensates for the enhanced noise caused by taking derivatives of the pixels.

For example, global metrics extractor 104 computes the derivative operator, wherein the first derivative at any point in an image is obtained by using the magnitude of the gradient at that point. For example, for a function $f(x, y)$, the gradient of $f$ at coordinates $(x, y)$ is defined as the vector $$\nabla f = \begin{bmatrix} G_x \\ G_y \end{bmatrix} = \begin{bmatrix} \frac{\partial f}{\partial x} \\ \frac{\partial f}{\partial y} \end{bmatrix}. \quad (1)$$

The gradient vector points in the direction of maximum rate of change of $f$ at (x, The magnitude of this vector, or the "gradient," is defined as $\nabla f$, where $$\nabla f = \mathrm{mag}(\nabla f) = (G_x^2 + G_y^2)^{1/2}. \quad (2)$$

This quantity equals the maximum rate of increase of $f(x, y)$ per unit distance in the direction of $\nabla f$, and the gradient is approximated with absolute values:

$$\nabla f \approx |G_x| + |G_y| \quad (3).$$

If the direction of the gradient vector, for example, let $\alpha(x, y)$ represent the direction angle of the vector $\nabla f$ at $(x, y)$, then, from the vector analysis, $$a(x, y) = \tan^{-1}\left(\frac{G_y}{G_x}\right), \quad (4)$$

where the angle is measured with respect to the x axis.

Note from Equations (1) and (2) that computation of the gradient of an image is based on obtaining the partial derivatives $\partial f/\partial x$ and $\partial f/\partial y$ at every pixel location. An example of a metrics extractor suitable for use with an embodiment is described in "Non-Linear Image Filter For Filtering Noise," application Ser. No. 09/602,572, which is incorporated herein by reference in its entirety.

The output of the line memories 102 is input to the de-blocking system 110, as is the field parity signal 114. The de-blocking system 110 and the field parity signal 114 are described in greater detail below.

Figure 2:
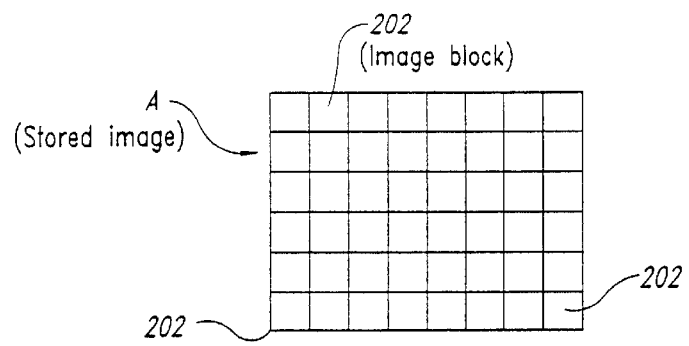
FIG. 2 illustrates a digital image divided into image blocks.

FIG. 2 illustrates an image A divided into several image blocks 202. Each image block 202 contains an equal number of pixels. While FIG. 2 illustrates the image block 102 with the pixels arranged in an 8*8 array, those skilled in the art will appreciate that a particular arrangement is not required by the present invention. Instead, the present invention supports image blocks using a variety of pixel arrays.

Figure 3:
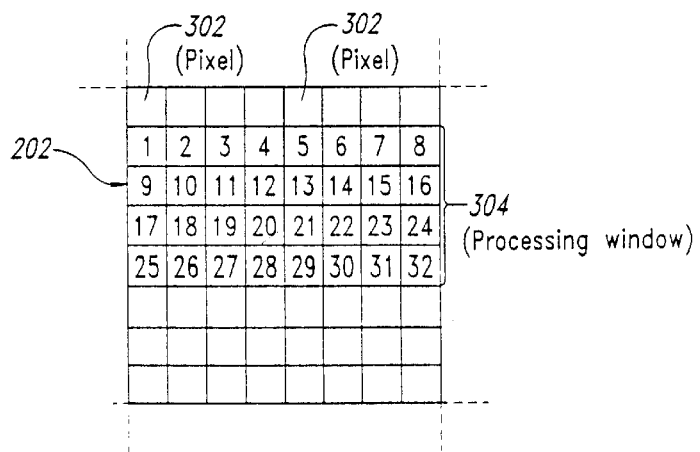
FIG. 3 is a more detailed depiction of one of the image blocks of FIG. 1 with pixels and a 4*8 processing window.

FIG. 3 illustrates one image block 202 partitioned into several pixels, wherein a pixel is designated by 302. A target pixel 302$i$, i.e., the pixel to be processed using the filter 100, and neighboring pixels are defined by a sub-block of the image 100, called a processing window 304. The center of the processing window is moved from pixel to pixel starting, for example, at the top left corner, and an operator is applied to the pixels to determine the pixels' metrics. For example, FIG. 3 illustrates a 4*8 processing window 304 with 32 pixels.

In one embodiment, the following Sobel-like operators detect image edges, which are boundaries between two regions with relatively distinct gray level properties. Thus, the value assigned to the target pixel 302$i$ according to the process performed by the filter 100 will be a function of its gray level and the gray level of the four neighboring pixels 302$_4$, 302$_{13}$, 302$_{20}$, and 302$_{11}$, where i=12. In this embodiment, the global metrics extractor 104 applies a horizontal Sobel-like operator h_s and a vertical Sobel-like operator v_s to each pixel 302 belonging to the 4*8 processing window 304 as follows.

$$2*h\_s = [-1\ 0\ 1] \quad 4*v\_s = [1\ 2\ 1]$$
$$\phantom{2*h\_s = }[-1\ 0\ 1] \phantom{\quad 4*v\_s = } [-1 - 2 - 1]$$

The results of the horizontal Sobel-like gradient operator h_s and the vertical Sobel-like-like gradient operator v_s applied to the 4*8 processing window 304 are averaged to compute a horizontal global metric H_S and a vertical global metric V_S, respectively. In one embodiment, the values of the pixels 302$_1$ through 302$_{32}$ are multiplied by the weighting coefficients of the horizontal Sobel-like operator h_s and the vertical Sobel-like operator v_s to effect a filtering capable of detecting edges along the horizontal and vertical direction of the 4*8 processing window 302, respectively. Thus, the horizontal global metric H_S and vertical global metric V_S are indicative of the degree of "edge-ness" of the 4*8 processing window 304. Operation of Sobel-like operators suitable for use in an embodiment is described in greater detail in "Post-Processing Method for Reducing Artifacts in Block-Coded Digital Images, and Post-Processing Device for Actuating such Method," Attorney Docket No. 97-AG-058, which is of common assignee and which is incorporated herein by reference in its entirety.

Of course, a particular global metric is not required by the present invention. Moreover, the size of the processing window 304 can be any size, such as 3*3, 6*6, 4*4, etc.

In signal processing terminology, a pixel that is to undergo signal processing is designated a target pixel X0. One of the neighboring pixels is designated as a neighboring pixel X−1 because it immediately precedes the target pixel X. A second one of the neighboring pixels is designated as a neighboring pixel X−2, which immediately precedes the neighboring pixel X−1. A neighboring pixel that immediately follows the target pixel X0 is designated as a neighboring pixel X1. A neighboring pixel that immediately follows the neighboring pixel X1 is designated as a neighboring pixel X2.

Figure 4:
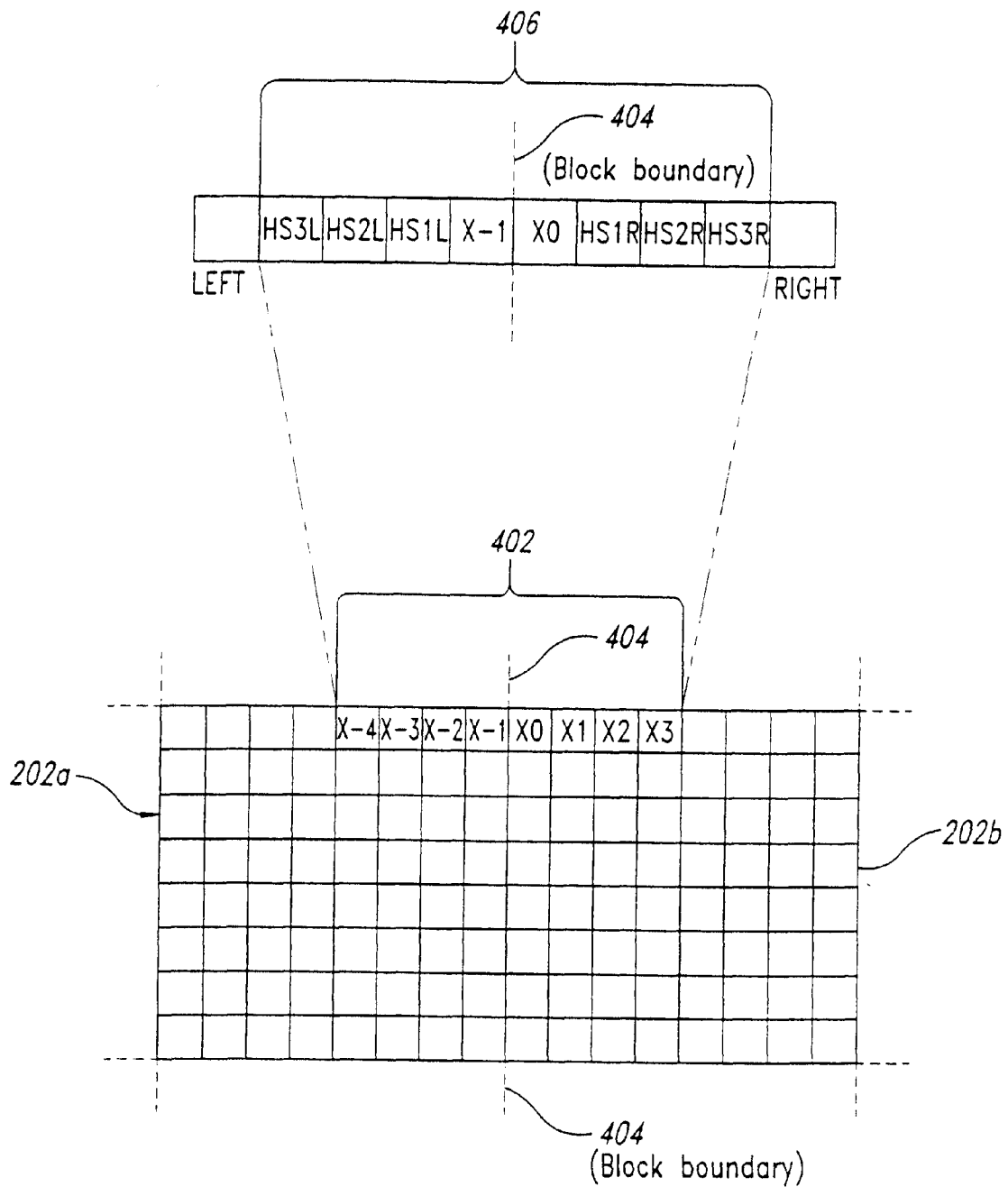
FIG. 4 illustrates two image blocks, a block boundary, a 1*8 horizontal processing window straddling the block boundary, and six horizontal gradient operator outputs.
Figure 5:
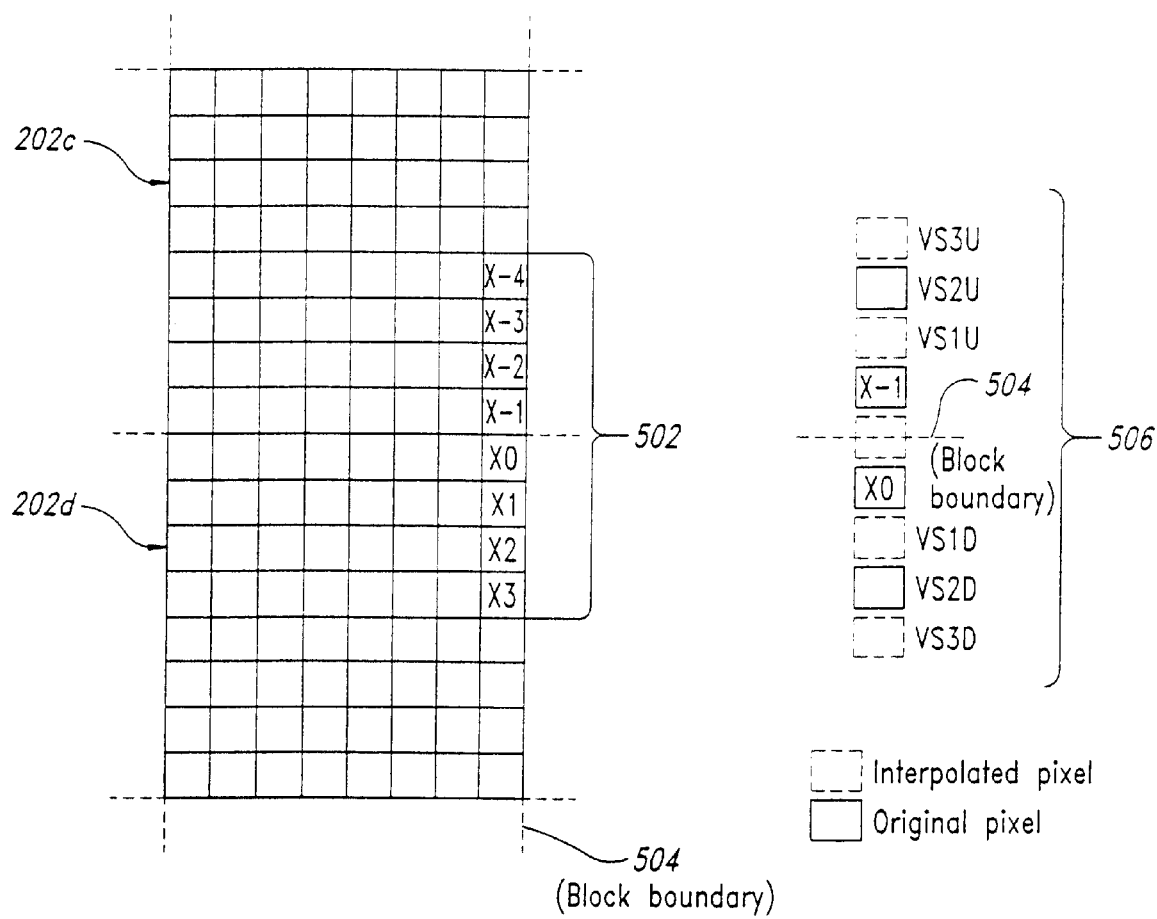
FIG. 5 illustrates two image blocks, a block boundary, a 8*1 vertical processing window straddling the block boundary, and six vertical gradient operator outputs.

FIG. 4 depicts an example embodiment using a 1*8 horizontal processing window 402 with pixels X–4, X–3, X–2, X–1, X0, X1, X2, and X3, and a block boundary 404 within the 1*8 horizontal processing window 402. FIG. 5 depicts an example embodiment using an 8*1 processing window 502 with pixels X–4, X–3, X–2, X–1, X0, X1, X2, and X3, and a block boundary 504 within the 8*1 processing window 502. At times, the processing window 304 may be positioned such that it straddles a block boundary. For example, depending on the compression ratio used in the image, blocking artifacts may become visible around a block boundary 404 or 504. The filter 100 filters out the blocking artifacts.

Recall that the global metrics extractor 104 uses Sobel-like operators to compensate for the enhanced noise caused by taking derivatives of the pixels. In, particular, the global metrics extractor 104 applies a horizontal Sobel-like operator h_s and a vertical Sobel-like operator v_s to each pixel in the horizontal and vertical processing windows, respectively. When the global metrics extractor 104 applies the horizontal Sobel-like operator h_s to the pixels in the processing window 402, six horizontal operator outputs 406 result, with three to the left and three to the right of the block boundary 404, respectively, as represented by the horizontal operators HS3L, HS2L, HS1L, HS1R, HS2R, and HS3R, respectively. When the global metrics extractor 104 applies the vertical Sobel-like operator v_s to the pixels in the processing window 502, six vertical operator outputs 506 result, with three up from and three down from the block boundary 504, respectively, as represented by the vertical operator outputs VS3U, VS2U, VS1U, VS1D, VS2D, and VS3D, respectively. The vertical operator outputs VS3U, VS1U, VS3D, and VS1D are interpolated pixel values. The vertical operator outputs VS2U and VS2D are original pixel values.

The global metrics extractor 104 also estimates local metrics, which are metrics related to the neighboring pixels 302, through $302_{32}$ that are not the target pixel 302$i$. Recall that the center of a processing window is moved from pixel to pixel to determine the pixels' metrics. FIGS. 4 and 5 illustrate horizontal and vertical processing windows 402 and 502, respectively, that the global metrics extractor 104 applies to estimate the local metrics. For example, the horizontal processing window 402 is applied to each pixel in two adjacent image blocks 202$a$ and 202$b$, and the vertical processing window 502 is applied to each pixel in the two image blocks 202$c$ and 202$d$. The horizontal processing window 402 is a predetermined number of pixels located to the left and right of a target pixel 302$i$ and belonging to the same image row as the target pixel 302$i$. Similarly, the vertical processing window 502 is a predetermined number of pixels located up from and down from a target pixel 302$i$ and belonging to the same image column as the target pixel 302$i$. The manner in which the number of pixels to be considered (i.e. horizontal length and the vertical length of the processing window) are determined is described in greater detail below.

The horizontal and vertical operator outputs provide the local metrics in the horizontal and vertical directions, respectively, for the pixel under examination X0. In one embodiment, the local metric is the high-frequency content of the neighboring pixels surrounding the X0 pixel depicted in FIG. 4 and FIG. 5.

Figure 6:
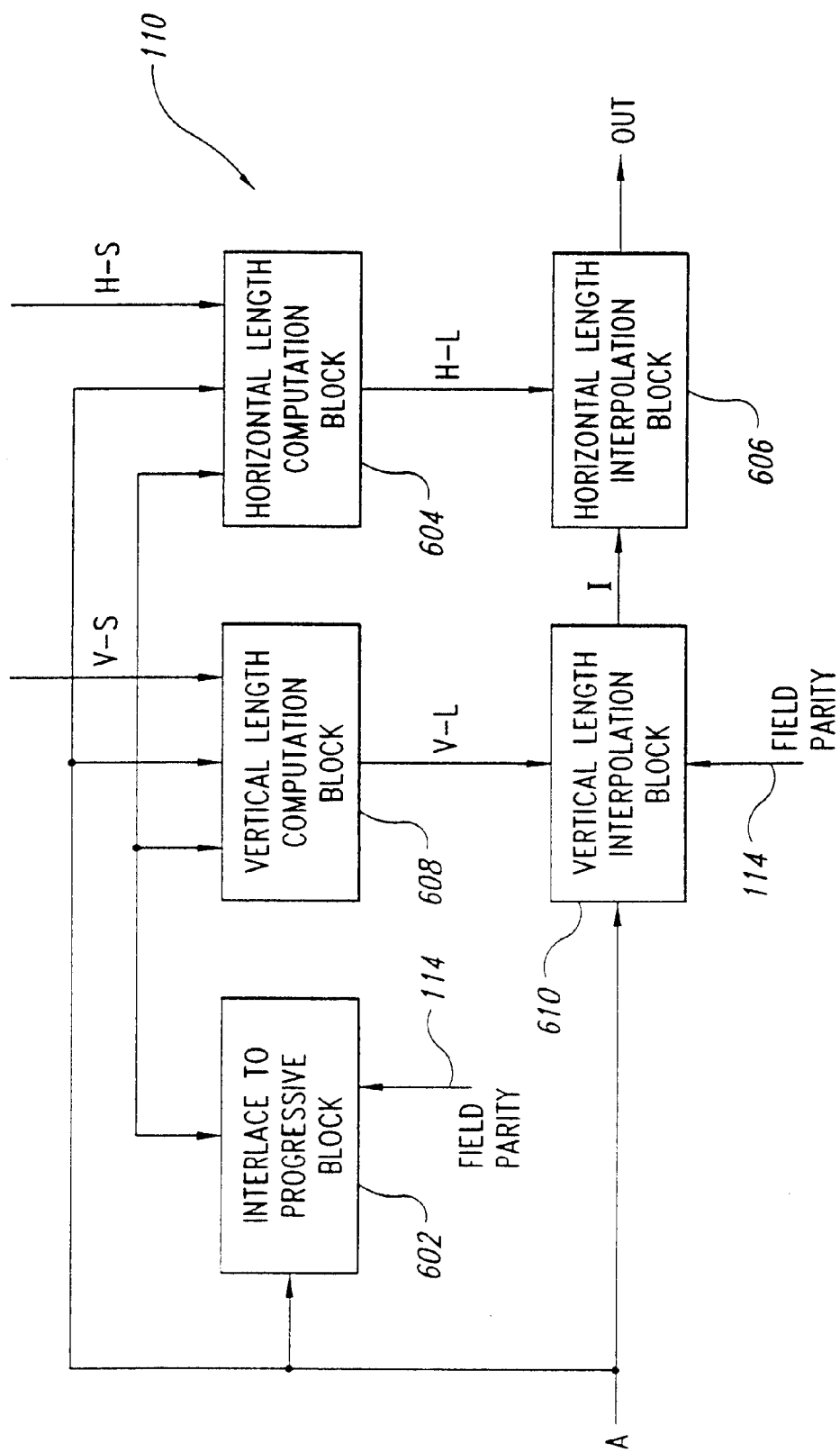
FIG. 6 is a more detailed block diagram of the de-blocking system of FIG. 1.

FIG. 6 illustrates an example embodiment of the de-blocking system 110. The de-blocking system 110 includes an interlace to progressive block 602, a horizontal length computational block 604, a horizontal interpolation block 606, a vertical length computation block 608, and a vertical interpolation block 610.

The interlace to progressive block 602 converts an interlaced signal to a non-interlaced signal. The interlace to progressive block 602 compensates for the fact that while many image sources use a well known interlaced format, most display units do not. For example, it is known that under some circumstances, the image signal is encoded as a macro-block in either intra-field mode or inter-field mode. Recall that depending on the compression ratio used in the images the effects of block coding the image become visible around the block boundaries. When the image signal is encoded in intra-field mode, the macro-block will contain pixels belonging to only one field, and the blocking artifact will affect the border of an 8*8 pixel sub-block. In inter-field mode, the encoder encodes a macro-block by interlacing rows belonging to two adjacent fields. When only one of the two fields (odd or even) is considered, the blocking artifact is at the border of a 4*8 pixel sub-block.

The interlace to progressive block 602 expands the 4*8 pixel sub-block into a 7*8 pixel sub-block, for example, by interpolating the missing odd or even pixels. Because the image is scanned into the filter 100 one row at a time, the filter 100 receives an odd row, then an even row, then an odd row, then an even row, etc., or vice versa. When the encoder encodes in intra-field, all fields are present and no interpolation is necessary. When the encoder encodes in inter-field, however, only all odd or all even rows are scanned in, and the interlace to progressive block 602 expands the 4*8 block by interpolating the missing rows. The expansion produces more pixels and thus better local information for estimating local metrics.

The parity signal 114 is input to the interlace to progressive block 602 to change the pixel selection according to whether the interlace to progressive block 602 converts missing lines with odd parity or missing lines with even parity. Implementation of the field parity signal 114 in the interlace to progressive block 602 is well known.

The conversion may be termed "interlace-to-progressive conversion." Of course, a particular type of interlace-to-progressive conversion is not required by the present invention. Thus, interlace to progressive block 602 can perform scan line duplication, scan line interpolation, and field processing. For example, one embodiment of the interlace to progressive block 602 includes a nine-point median filter (not shown) that smoothes the image by replacing each target pixel value with the median gray scale value of its eight immediate neighboring pixels. Of course, those skilled in the art will appreciate that the nine-point median filter is not required by the present invention. The output of the interlace to progressive block 602 is input to the horizontal length computational block 604.

Recall that the filter 100 is based on "fuzzy logic" processing. As used herein, "fuzzy logic" generally provides a way to classify data according to a degree of membership in a fuzzy set that varies continuously from zero (not a member) to one (absolutely a member). Fuzzy logic requires a describing function, called a "membership function," to fully define the boundaries of a fuzzy set. The fuzzy set becomes a way of assigning exact mathematical meaning to a subjective sounding linguistic term such as "similarity," "brightness," or "luminance." One embodiment assigning exact mathematical meaning to the "edgeness" of the pixels in a processing window. The H_S global metric is used to determine a trapezoidal shaped membership function used by the fuzzy process.

Figure 7:
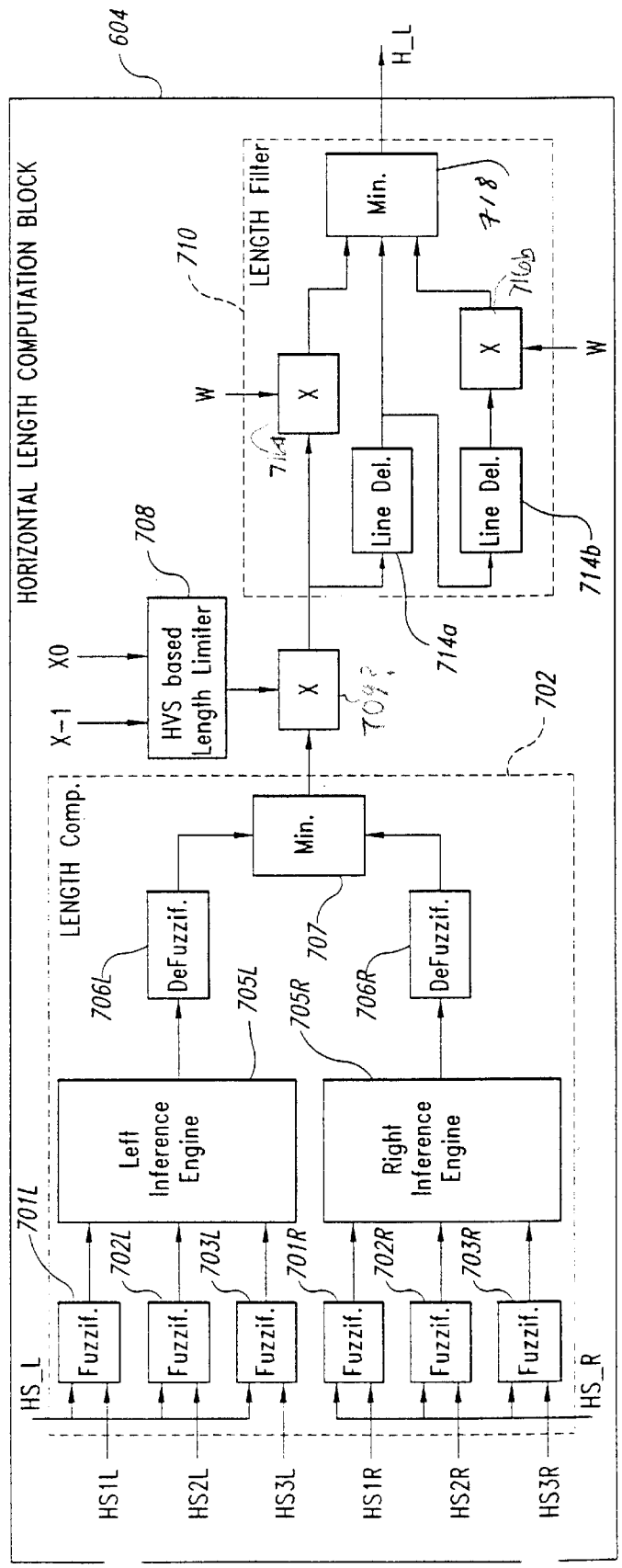
FIG. 7 is a more detailed block diagram of the horizontal length computation block of the de-blocking system of FIG. 6.

FIG. 7 is a more detailed illustration of an example embodiment of the horizontal length computational block 604. The horizontal length computational block 604 includes a length computation block 702, a human visual system (HVS) based length limiter 708, a multiplier 709, and a length filter 710.

The horizontal length computational block 604 includes a length computation block 700 with several left and right internal fuzzification blocks 701L, 702L, 703L, 701R, 702R, and 703R, left and right inference engines 705L and 705R, respectively, left and right defuzzification blocks 706L and 706R, and a minimization block 707. The horizontal operators HS3L, HS2L, HS1L, HS1R, HS2R, and HS3R are input to the left and right internal fuzzification blocks 701L, 702L, 703L, 701R, 702R, and 703R, respectively.

Recall from above that the horizontal processing window 402 is a predetermined number of pixels located to the left and right of a target pixel 302i. The fuzzification blocks 701L, 702L, 703L, 701R, 702R, and 703R implement the trapezoidal shaped membership function such that fuzzification blocks 701L, 702L, and 703L compute a possible "length" for the left side of the block boundary of the processing window 406 and the fuzzification blocks 701R, 702R, and 703R compute a possible "length" for the right side of the processing window 406. In particular, the fuzzification blocks 701L, 702L, 703L, 701R, 702R, and 703R take the gray level values of horizontal operators HS3L, HS2L, HS1L, HS1R, HS2R, and HS3R, which range from 0–255, and weight them using HS_L to generate a value between zero (not a member) and one (absolutely a member). The weighting functions are stored in a lookup table (not shown) and have values ranging from zero to two. The "length" metric specifies how many pixels the filter 100 is to process for a particular iteration.

The values between zero (not a member) and one (absolutely a member) generated by the fuzzification blocks 701L, 702L, 703L, 701R, 702R, and 703R are input to the left and right inference engines 705L and 705R. The left and right defuzzification blocks 706L and 706R map the outputs of the left and right inference engines 705L and 705R back into the domain of 0–255. The fuzzification blocks 701L, 702L, 703L, 701R, 702R, and 703R, the left and right inference engines 705L and 705R, and the left and right defuzzification blocks 706L and 706R implement the following fuzzy rules.

(1) if HS1$a$ is big, then length equals zero;
(2) if HS1$a$ is small and HS2$a$ is big, then length equals 2;
(3) if HS1$a$ is small and HS2$a$ is small and HS3$a$ is big, then length equals 3;
(4) if HS1$a$ is small and HS2$a$ is small and HS3$a$ is small, then length equals 4;

where a=L, R.

According to the operation of the fuzzy logic, if the pixels immediately to the left and right of the pixels forming the block boundary 404 are members of the fuzzy set, then the length parameter is "zero" because the pixels immediately to the left and right of the pixels forming the block boundary 404 are probably image edges. That is, if the difference in gray levels of the pixels immediately to the left and right of the pixels forming the block boundary 404 are big as compared to the gray levels of the pixels forming the block boundary 404, then an edge or texture has been detected. To preserve these image details, no post-processing filtering is performed, as indicated by Rule (1).

If, on the other hand, the pixels immediately to the left and right of the pixels forming the block boundary 404 are not members of the fuzzy set, but the next neighboring pixels are members of the fuzzy set, then the length parameter is "two" because the image edges or textures are likely located where the next neighboring pixels are. That is, if the difference in the gray levels of the next neighboring pixels are big as compared to the gray levels of the pixels immediately to the left and right of the pixels forming the block boundary 404, then post-processing filtering is performed on a four-pixel block, as indicated by Rule (2).

Accordingly, if Rule (3) is true, then post-processing filtering is performed on a six-pixel block. If Rule (4) is true, then post-processing filtering is performed on a 8-pixel block. Of course, it is not intended to limit the present invention to a particular membership (or fuzzy) function. Rather, any fuzzy function may be used in the de-blocking system 110.

The minimization block 707 selects a minimum value of the length from the output of either the left or the right defuzzification block, 706L or 706R, respectively. That is, the minimum length is selected between the two sides of the operators at the output of the two processes acting on the left- and right-side pixels.

The HVS-based length limiter 708 which evaluates a metric of a processing window. Generally, human visual systems use algorithms to optimize an image according to the way the human eye perceives the image. Human visual systems are described in "Second-Generation Image Coding: An Overview," by M. M. Reid, R. J. Millar, and N. D. Black, in ACM COMPUTING SURVEYS, Vol. 29, No. 1 (March 1997), Pages 3–29, incorporated herein by reference in its entirety.

Figure 8:
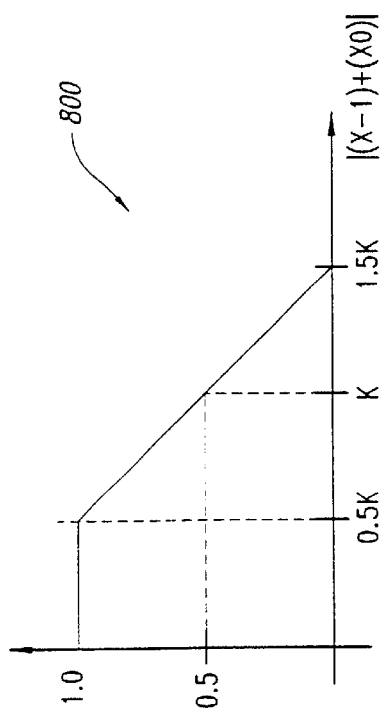
FIG. 8 is a graphical representation of the human visual system (HVS)-based weighting factor used by the HVS-based limiter of the horizontal length computation block of FIG. 7.

In one embodiment, the HVS-based length limiter 708 evaluates an estimation of human eye sensitivity to a minimum noticeable gray level difference between the target pixel X0 and the neighboring pixel X−1 to determine "brightness." The HVS based length limiter 708 processes the two pixels according to the HVS-based weighting factor 800 depicted in FIG. 8 and the following formula:

$$K = \frac{[(x-1)+(x0)]}{4}. \quad (5)$$

A multiplier 709 then multiplies the output of the HVS-based length limiter 708 with the minimum value of the length output of the minimization block 707. The output of the multiplier 709 is input to a length filter 710.

The length filter 710 includes two line delays 714a and 714b, two multipliers 716a and 716b, and a minimization block 718. The output of the multiplier 709 is input to the line delay 714a, whose output is further delayed by the line delay 714b. The output of the line delay 714b is input to the multiplier 716b, which weights the delayed signal using a weighting coefficient w, which is stored in a lookup table (not shown). The value of the weighting coefficient w ranges from zero to two. The output of the multiplier 709 also is input to the multiplier 716a, which also weights the delayed signal using the weighting coefficient w. The outputs of the two multipliers 716a and 716b and the line delay 714b are input to the minimization block 718, which computes a final horizontal length H_L by filtering the three length values (i.e., the outputs of the two multipliers 716a and 716b and the line delay 714b).

Figure 9:
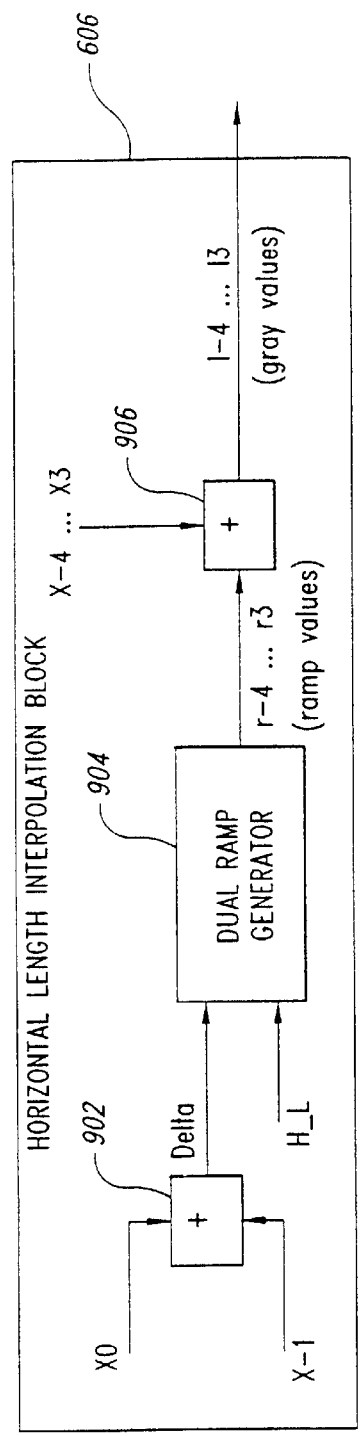
FIG. 9 is a more detailed block diagram of the horizontal interpolation block of the de-blocking system of FIG. 6.

The output of the horizontal length computational block 604 is input to a horizontal length interpolation block 606, which generates interpolated gray level values associated with neighboring pixels in the horizontal processing window 402. FIG. 9 is a more detailed illustration of an example horizontal interpolation block 606, which includes an adder 902, a dual ramp generator 904, and an adder 906. The adder 902 sums the gray level value of the target pixel X0 with the neighboring pixel X–1 gray level value, generating a "delta" between the two pixels. The delta is output to the dual ramp generator 904, along with the final horizontal length H_L. The dual ramp generator 904 generates ramp values r–4, r–3, r–2, r–1, r0, r1, r2, and r3, which, when combined with the pixels from a processing window using the adder 906, produces gray level values I–4, I–3, I–2, I–1, I0, I1, I2, and I3 for the pixels X–4, X–3, X–2, X–1, X0, X1, X2, and X3, respectively, in the horizontal processing window 406. The delta input to the dual ramp generator 904 is not placed just in the middle of the two pixels. Instead, the delta is shifted into position.

Figure 10:
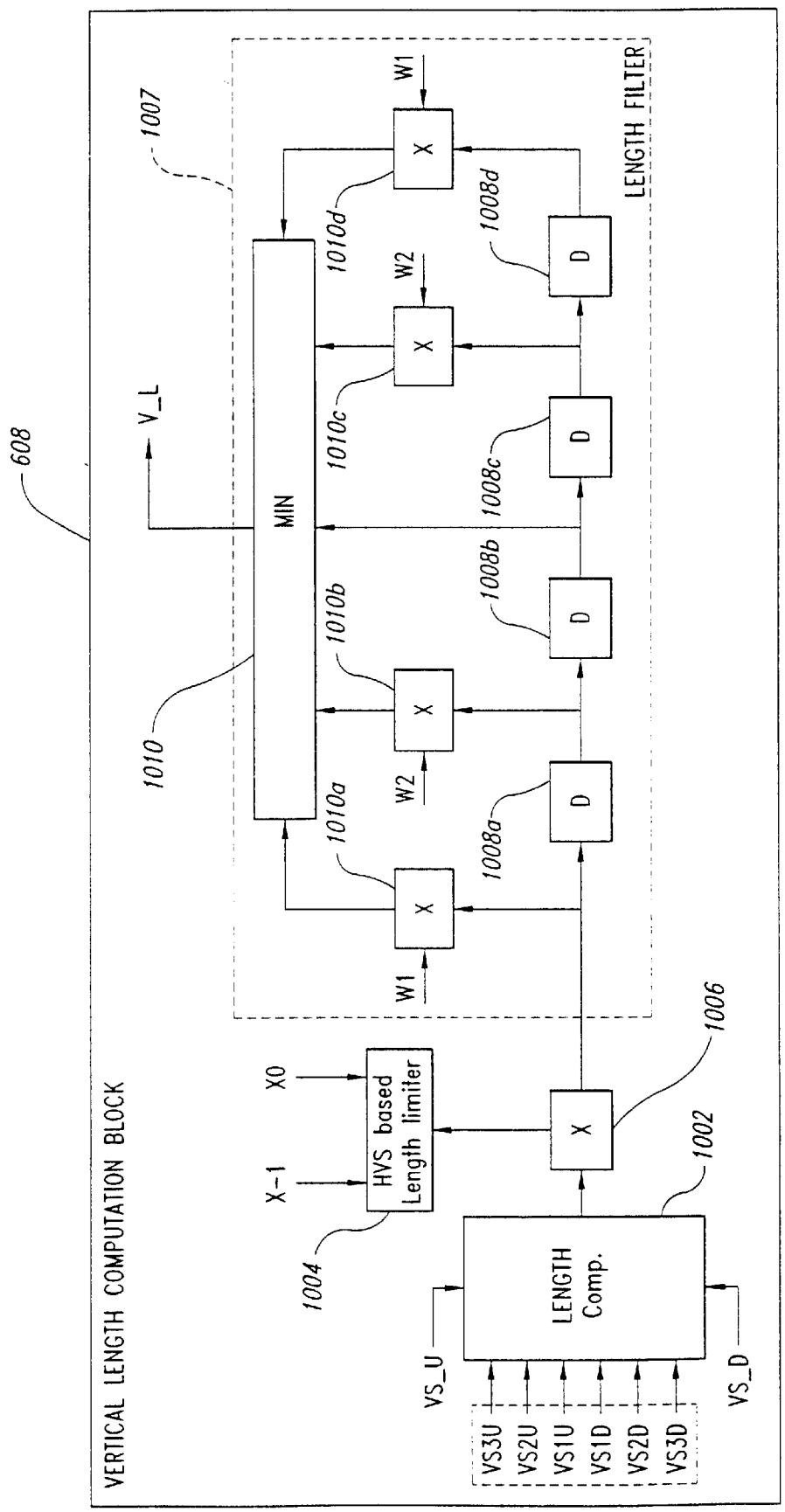
FIG. 10 is a more detailed block diagram of the vertical length computation block of the de-blocking system of FIG. 6.

The interlace to progressive block 602 output is input to a vertical length computational block 606, which computes the vertical extent of an appropriate interpolating ramp. FIG. 10 is a more detailed illustration of an example vertical length computation block 608, which includes a length computation block 1002, an HVS based length limiter 1004, a multiplier 1006, and a length filter 1007.

The vertical length computational block 606 operation is similar to the operation of the horizontal length computational block 608. That is, the vertical length computational block 606 includes several up and down internal fuzzification blocks similar to the internal fuzzification blocks 701L, 702L, 703L, 701R, 702R, and 703R of the horizontal length computational block 608. The vertical length computational block 606 includes up and down inference engines similar to the left and right inference engines 705L and 705R of the horizontal length computational block 608. The vertical length computational block 606 also includes up and down defuzzification blocks similar to the left and right defuzzification blocks 706L and 706R of the horizontal length computational block 608. The vertical length computational block 606 includes a minimization block similar to the minimization block 707 of the horizontal length computational block 608.

The vertical operators VS3L, VS2L, VS1L, VS1R, VS2R, and VS3R are input to the vertical length computational block 606, which computes a possible "length" for the up portion of the block boundary 504 of the processing window 506 and a possible "length" for the down of the block boundary 504 of the processing window 506.

The HVS-based length limiter 1004 that, like the HVS-based length limiter 708, provides an estimate of human eye sensitivity to a minimum noticeable gray level difference between the target pixel X0 and the neighboring pixel X–1 according to the HVS-based weighting factor 900.

The output of the length computation block 1002 along with the output of the HVS-based length limiter 1004 are input to the multiplier 1006, which multiplies the output of the HVS-based length limiter 1004 with the minimum value of the vertical length output of the length computation block 1002. The output of the multiplier 1006 is input to the length filter 1007.

The length filter 1007 operation is similar to the operation of the length filter 710, except that the length filter 1007 includes four line delays 1008a, 1008b, 1008c, and 1008d, four multipliers 1010a, 1010b, 1010c, and 1010d, and a minimization block 1010 receives five vertical length values, rather than three horizontal length values. As shown in FIG. 10, the output of the multiplier 1006 is delayed four times using the four line delays 1108a, 1108b, 1008c, and 1008d. The multipliers 1010a, 1010b, 1010c, and 1010d weight the lengths using two weighting coefficients W1 and W2 retrieved from a lookup table (not shown), and whose values range from zero to two. The minimization block 1010 receives the five vertical length values and computes a final vertical length V_L by filtering the five length values (i.e., the outputs of the four multipliers 1010a, 1010b, 1010c, and 1010d and the line delay 1008b).

The differences in the horizontal length computational block 604 and vertical length computational block 608 are based on a trade-off between cost and performance. For example, less memory is acceptable for the horizontal length computational block 608 than is acceptable for the vertical length computational block 604.

The output of the vertical length computational block 608 is input to a vertical interpolation block 610, which generates interpolated gray level values associated with neighboring pixels in the vertical processing window 502 using the field parity signal 114.

Figure 11:
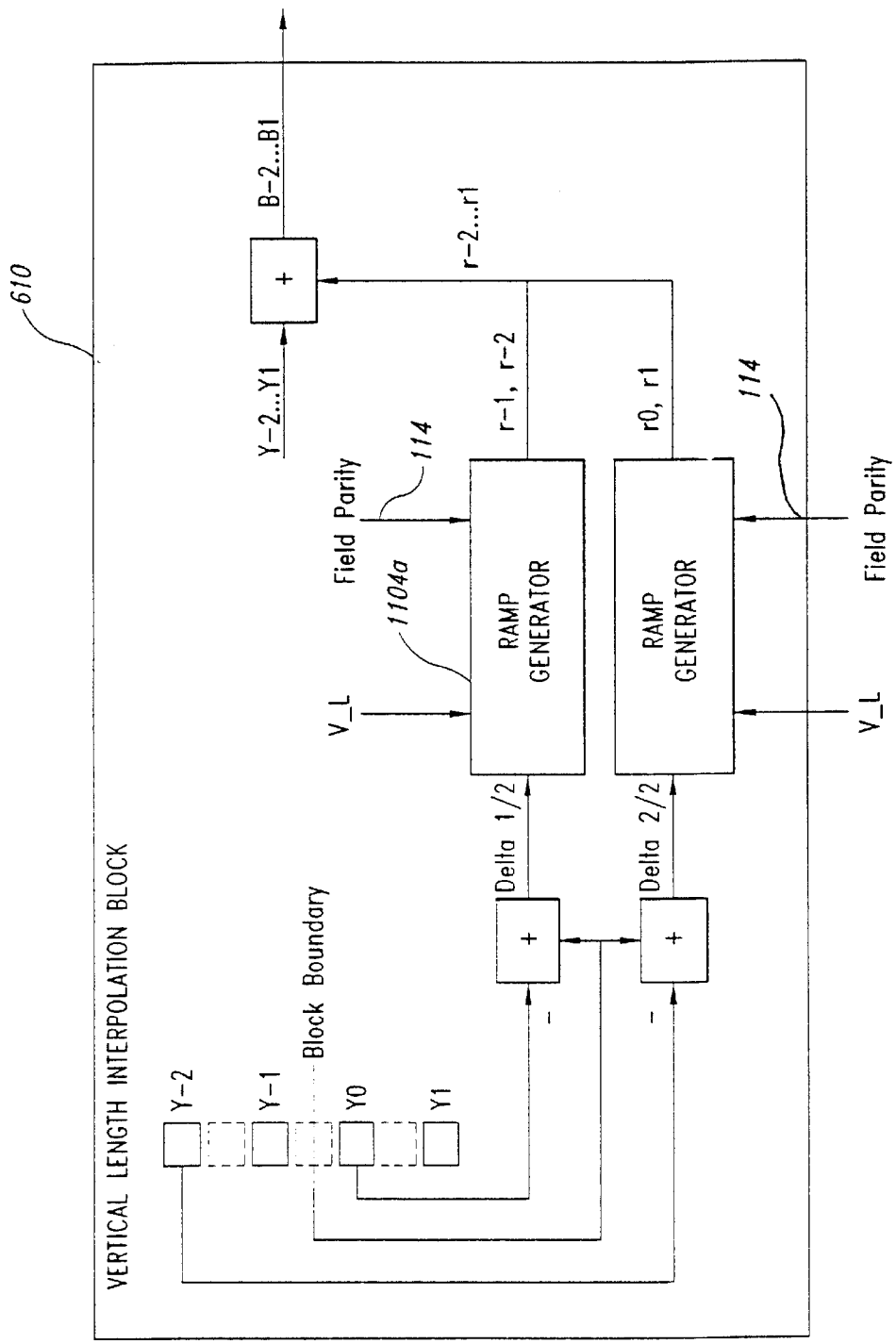
FIG. 11 is a more detailed block diagram of the vertical interpolation block of the de-blocking system of FIG. 6.

FIG. 11 is a more detailed illustration of the vertical interpolation block 610, which includes two adders 1102a and 1102b, two ramp generators 1104a and 1104b, and an adder 1106. The operation of the vertical interpolation block 610 is similar to the operation of the horizontal interpolation block 608.

For example, the pixel X0 is input to the adder 1102a, the pixel X–1 is input to the adder 1102b, and an interpolated pixel associated with the block boundary 504 is input to both adders 1102a and 1102b. The dotted lines represent interpolated pixels, whereas the solid lines represent original pixels. The adders 1102a and 1102b sum the gray level values of the pixels, generating two "deltas." The deltas are input to the two ramp generators 1104a and 1104b, along with the final vertical length V_L and the field parity signal 114. The ramp generator 1104a generates ramp values r–1 and r–2, and the ramp generator 1104b generates ramp values r0 and r1, which, when combined with the pixels X–2, X–1, X0, X1 from the processing window 506 using the adder 1006, produce gray level values I–2, I–1, I0, I1 and I2.

Figure 12:
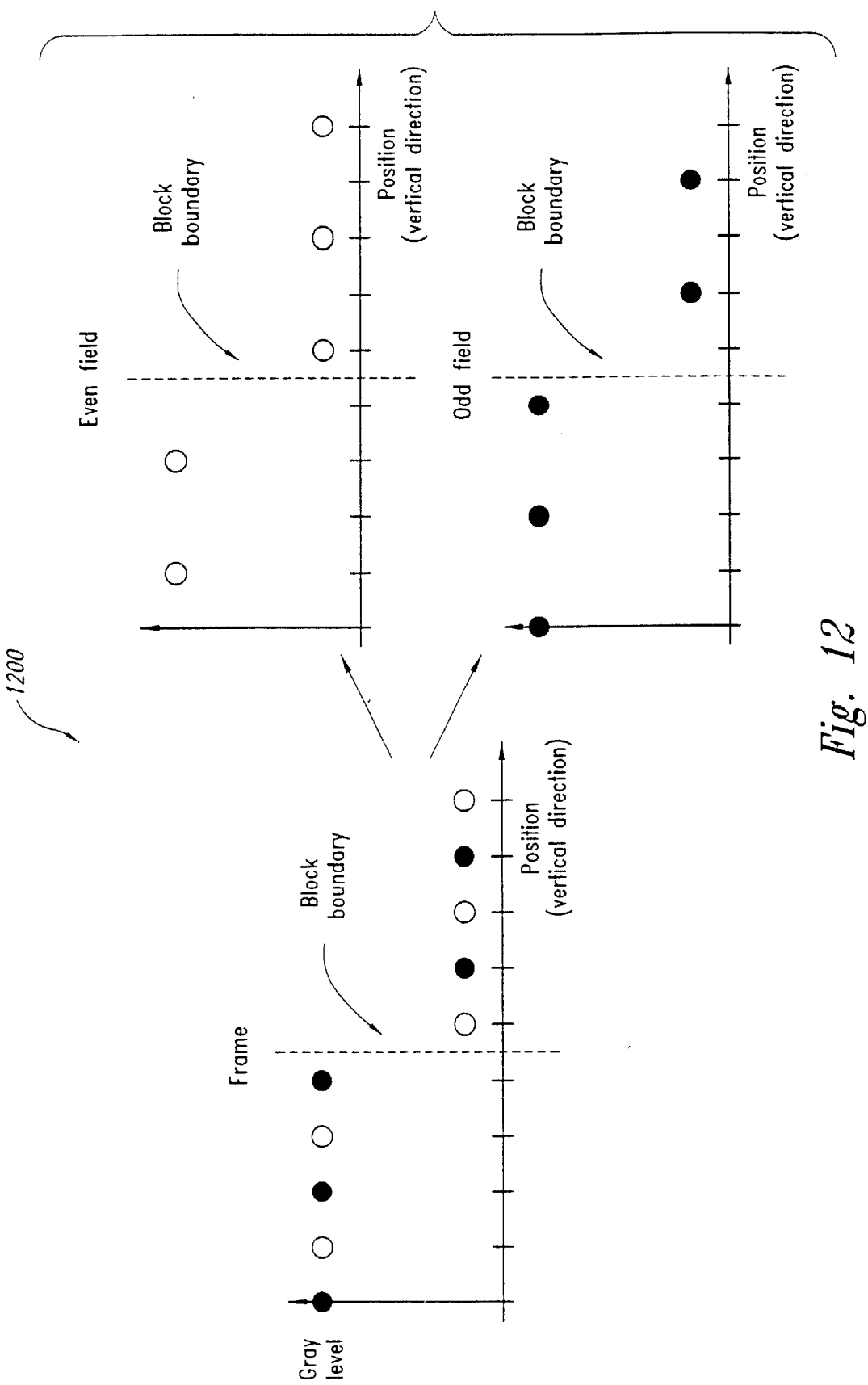
FIG. 12 is a graphical representation of a blocking artifact position in inter-field mode with respect to odd and even fields.
Figure 13:
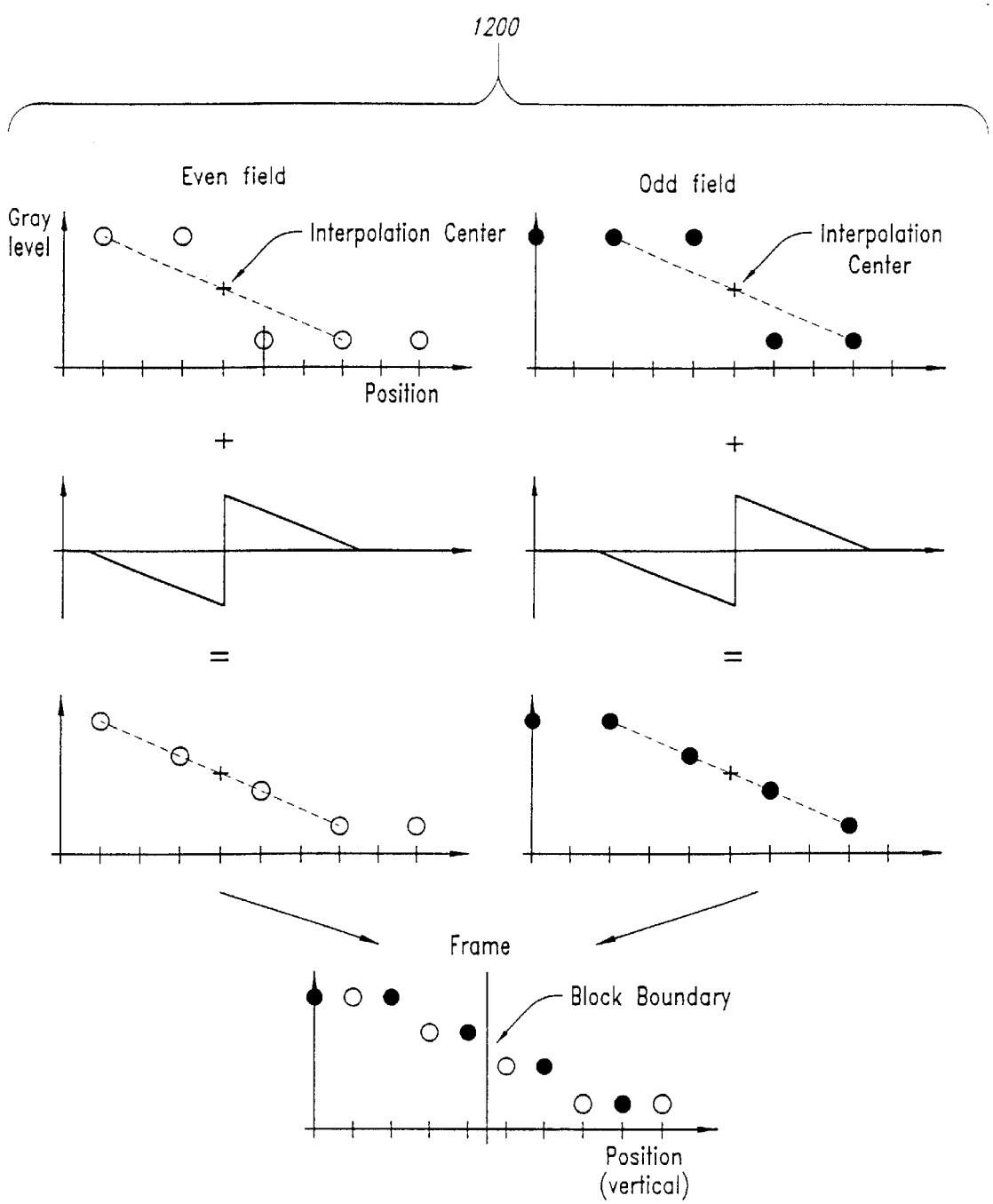
FIG. 13 is a graphical representation of the origin of staircase noise using the de-blocking system of FIG. 6.

Recall that when a macro-block contains pixels belonging to only one field (either the odd field or the even field), there are blocking artifacts. FIG. 12 is a graphical representation 1200 of blocking artifact position in inter-field mode with respect to odd and even fields. Recall further that the image artifacts due to blocking consist of staircase noise. This is because the correcting coefficients are the same for both the odd and even fields. FIG. 13 is a graphical representation 1300 of staircase noise origination. The field parity signal 114 described above is applied to the vertical length interpolation block 610 to avoid staircase noise. The interpolating ramp is shifted according to the field parity signal 114. That is, by adopting the inter-field processing scheme, the position of the lines with respect to interpolation center is the same in both odd and even fields. Notice that the deltas of the ramp generators are not placed just in the middle of the two pixels, rather, the deltas of the are shifted into position.

FIGS. 14A through 14F are graphical representations 1400a through 1400f, respectively, of the results obtained from shifting the interpolating ramp. The graphical representation 1400a depicts the horizontal dimension of the gray level difference between two pixels on the opposite side of a blocking artifact. The graphical representation 1400b depicts the horizontal dimension of a fuzzy logic computation of a length parameter. The graphical representation 1400c depicts the summing of the horizontal dimension of the gray level difference between two pixels on the opposite side of a blocking artifact with the horizontal dimension of a fuzzy logic computation of a length parameter.

The graphical representation 1400d depicts the vertical dimension of the gray level difference between two pixels on the opposite side of a blocking artifact. The graphical representation 1400e depicts the vertical dimension of a fuzzy logic computation of a length parameter. The graphical representation 1400f depicts the summing of the vertical dimension of the gray level difference between two pixels on the opposite side of a blocking artifact with the vertical dimension of a fuzzy logic computation of a length parameter.

Note that the global metrics extractor 104 performs a well known pixel delay technique. Note also that according to one embodiment of the invention, vertical filtering is performed first so that only pixel delays are required to generate the horizontal processing window 402 to apply the horizontal filtering to already processed pixels.

The filter 100 may be implemented using hardware, software, or a combination of hardware and software, and may be implemented in a computer system or other processing system. In an embodiment where the invention is implemented using a combination of hardware and software, the invention may be implemented using an application-specific integrated circuit (ASIC). In an embodiment where the invention is implemented using hardware, the hardware components may be a state machine. In an embodiment where the filter 100 is implemented using software, the software may be stored on a computer program product (such as an optical disk, a magnetic disk, a floppy disk, etc.) or a program storage device (such as an optical disk drive, a magnetic disk drive, a floppy disk drive, etc.). The filter 100 may be implemented in a microprocessor or as a programmable digital filter.

Although specific embodiments of, and examples for, the invention are described herein for illustrative purposes, various equivalent modifications are possible within the scope of the invention, as will be recognized by those skilled in the relevant art. Thus, while several embodiments are described with respect to noise suppression, the teachings provided herein can be applied to image enhancement operations such as contrast improvement, edge enhancement, spatial filtering, image smoothing, and image sharpening, for example.

These and other changes may be made to the invention in light of the above-detailed description. In general, in the following claims, the terms used should not be construed to limit the invention to the specific embodiment disclosed in the specification and claims, but should be construed to include all image processors that operate under the claims to provide a non-linear filter that reduces noise using recursive noise level estimation.

From the foregoing it will be appreciated that, although specific embodiments of the invention have been described herein for purposes of illustration, various equivalent modifications may be made without deviating from the spirit and scope of the invention. Accordingly, the invention is not limited except as by the appended claims.

What is claimed is:

1. An image filter, comprising:
   a metrics extractor that extracts global metrics and estimates local metrics from an image, wherein the image includes two image blocks having a block boundary between them, wherein the block boundary causes noise; and
   a de-blocker system, coupled to the metrics extractor, having a ramp generator that reduces the noise from the image.

2. The image filter of claim 1, further comprising a processing window that processes the image with the image block boundary, the processing window having a calculated length determined by a length computational block, wherein the ramp generator operates according to the calculated length.

3. The image filter of claim 1, further comprising a processing window with a calculated vertical length and a processing window with a calculated horizontal length.

4. A method for reducing noise in block-coded digital images, the method comprising:
   dividing an input image into a plurality of image blocks, wherein each image block in the plurality of image blocks has a plurality of pixels, and wherein the plurality of pixels includes a target pixel and a plurality of neighboring pixels adjacent to the target pixel;
   processing the plurality of image blocks such that the input image is represented by an aggregate of the plurality of image blocks having at least one image block boundary;
   estimating global metrics of the plurality of image blocks using information associated with the plurality of image blocks;
   estimating local metrics of each pixel in the plurality of pixels in the plurality of image blocks using information associated with the neighboring pixels; and
   de-blocking the input image using a de-blocking system, wherein the de-blocking system uses a ramp generator such that any artifacts from the image block boundary are reduced.

5. The method of claim 4, further comprising filtering at least one of the image blocks to remove grid noise.

6. The method of claim 4, further comprising estimating high frequency content of the input image.

7. The method of claim 4, further comprising performing a fuzzy logic computation of a length metric of the input image.

8. The method of claim 4, further comprising determining a gray level difference between first and second neighboring pixels, the first neighboring pixel selected from among the plurality of neighboring pixels being positioned on a first side of the block boundary, the second neighboring pixel selected from among the plurality of neighboring pixels being positioned on a second side of the block boundary.

9. The method of claim 4, further comprising combining results of performing a fuzzy logic computation of a length metric of the input image and of determining a gray level difference between first and second neighboring pixels selected from among the plurality of neighboring pixels.

10. The method of claim 4, further comprising measuring a degree of visual relevance among the plurality of pixels and determining a relative position of the plurality of pixels.

11. The method of claim 4, further comprising applying a gradient operator to at least one of the image blocks to produce an output.

12. The method of claim 4, further comprising applying a gradient operator to at least one of the image blocks, wherein the gradient operator is applied to pixels positioned along a horizontal axis of that image block separately from pixels positioned along a vertical axis of that image block, the gradient operator producing an output.

13. The method of claim 4, further comprising applying a Sobel-like operator to at least one of the image blocks to produce an output.

14. The method of claim 4, further comprising applying a gradient operator output to an image sub-block having a set of pixels selected from among the plurality of pixels, wherein the set of pixels in the image sub-block forms a four-by-eight matrix.

15. The method of claim 4, further comprising averaging a plurality of gradient operator outputs to produce at least one of the global metrics.

16. The method of claim 4 wherein using the information associated with the plurality of image blocks includes using information associated with horizontal edges and vertical edges of the plurality of image blocks.

17. The method of claim 4 wherein using information associated with the neighboring pixels includes using information associated with horizontal edges and vertical edges of the neighboring pixels.

18. An apparatus, comprising:
   a metrics extractor to obtain metrics from an image, the image including at least two image blocks having pixels and a block boundary between the image blocks;
   a length computation unit coupled to the metrics extractor to compute a length of one of the image blocks based at least in part on fuzzy logic that uses the metrics; and
   a de-blocker system having a length interpolation unit coupled to the length computation unit to generate ramp values, associated with the pixels, from the computed length and to generate interpolated image level values associated with the pixels to reduce noise at the block boundary if the generated ramp values are respectively combined with the pixels.

19. The apparatus of claim 18 wherein the interpolated image level values include interpolated gray level values.

20. The apparatus of claim 18 wherein the length computation unit includes:
   a horizontal length generator having the fuzzy logic to generate a horizontal length of an image block; and
   a vertical length generator to generate a vertical length of that image block.

* * * * *